March 13, 1945.  A. J. TOWNSEND  2,371,323
LOCOMOTIVE SUSPENSION
Filed Dec. 11, 1942  4 Sheets-Sheet 1
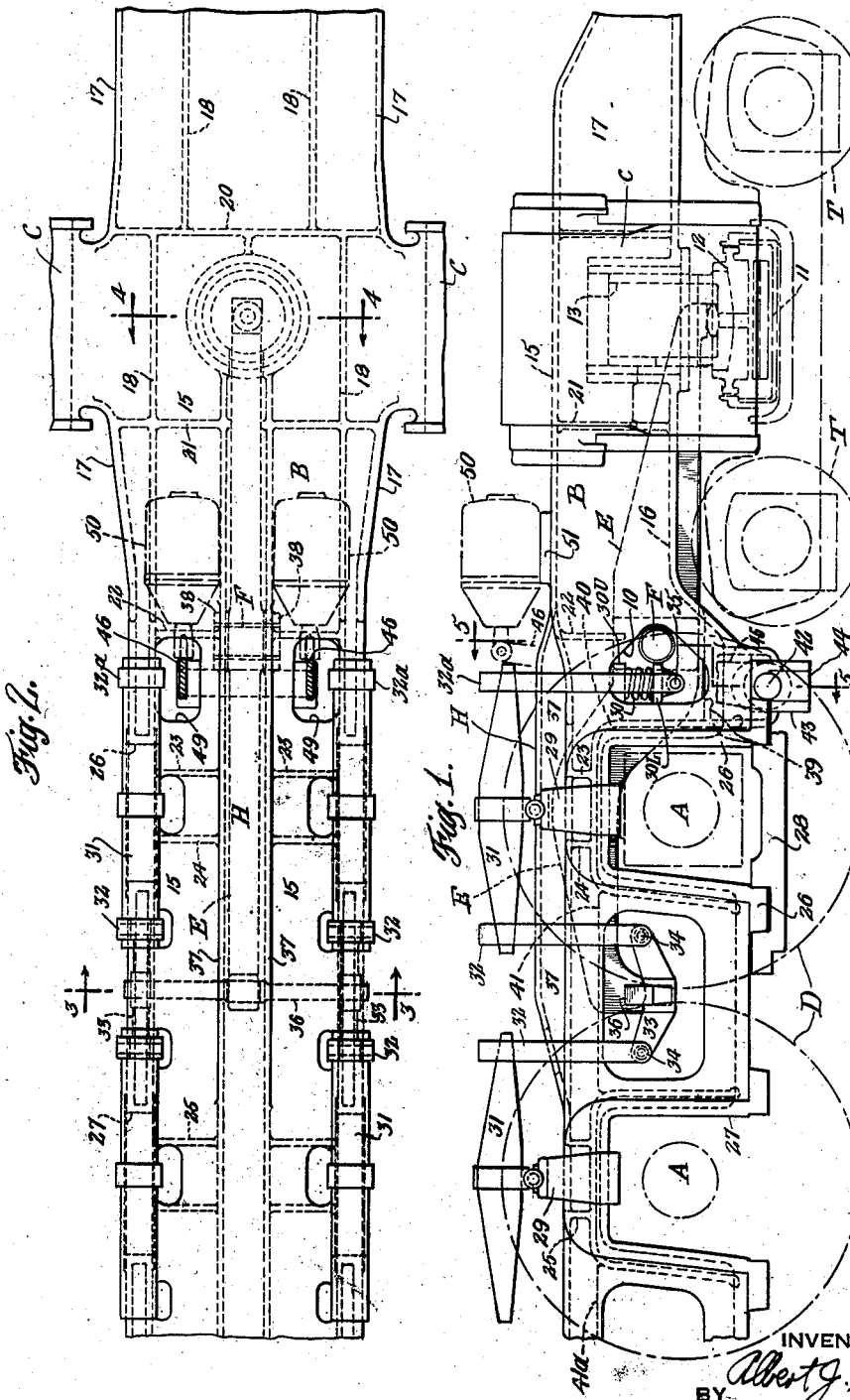
INVENTOR
Albert J. Townsend
BY
ATTORNEYS March 13, 1945.  A. J. TOWNSEND  2,371,323
LOCOMOTIVE SUSPENSION
Filed Dec. 11, 1942  4 Sheets-Sheet 2

March 13, 1945.   A. J. TOWNSEND   2,371,323
LOCOMOTIVE SUSPENSION
Filed Dec. 11, 1942   4 Sheets-Sheet 3

INVENTOR
Albert J. Townsend
BY
ATTORNEYS

March 13, 1945. A. J. TOWNSEND 2,371,323
LOCOMOTIVE SUSPENSION
Filed Dec. 11, 1942 4 Sheets-Sheet 4
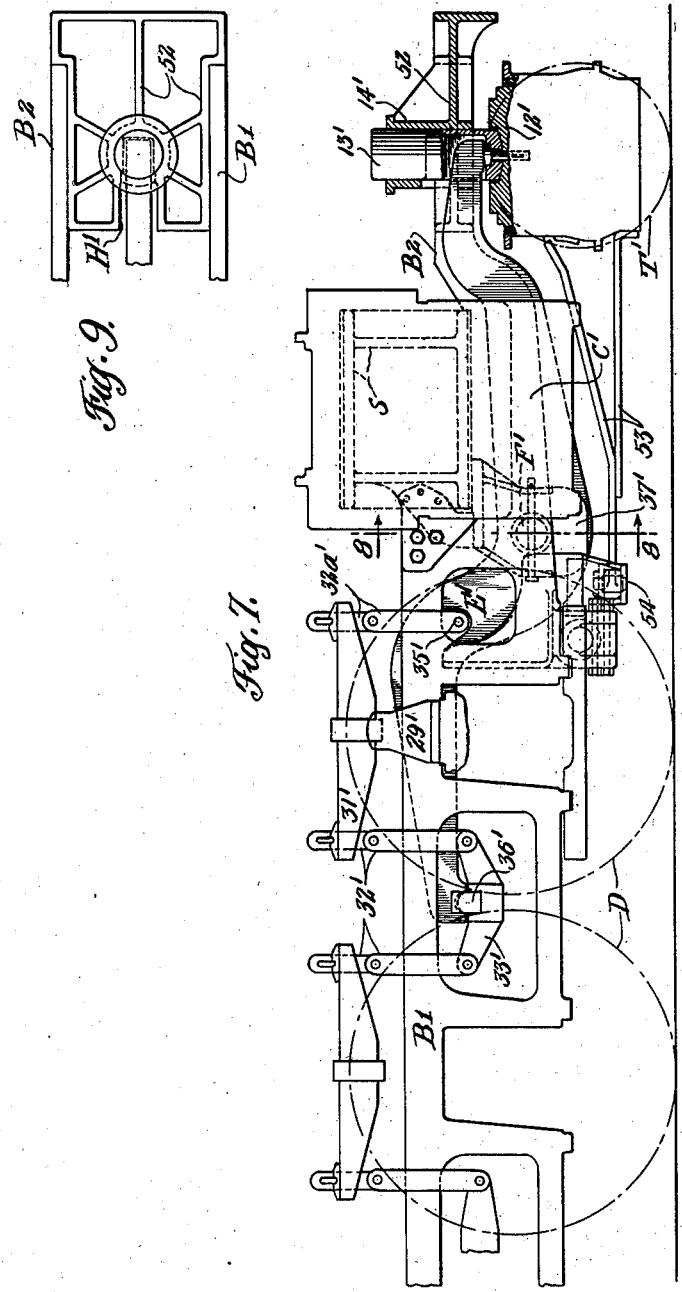
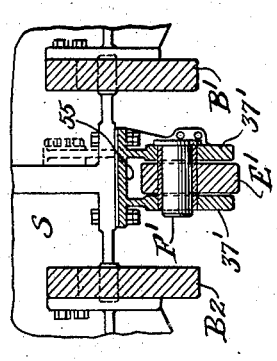
INVENTOR
Albert J. Townsend
BY
ATTORNEYS Patented Mar. 13, 1945

2,371,323

UNITED STATES PATENT OFFICE 2,371,323

LOCOMOTIVE SUSPENSION

Albert J. Townsend, Lima, Ohio

Application December 11, 1942, Serial No. 468,643

13 Claims. (Cl. 105—82)

This invention relates to locomotive suspension, being concerned both with the locomotive framing and the spring rigging on which it is carried, the invention being especially concerned with the equalizer mechanism of the spring rigging, and the relation of the equalizer mechanism to the main framing and/or truck framing.

In general, the invention contemplates a new and advantageous mode of distributing superstructure loads between two different groups of wheels of the locomotive, wherein at least one of said groups comprises at least two axles having spring and/or equalizing means in common.

Although aspects of the invention are applicable to wheel arrangements wherein the grouping consists merely in a subdivision (functional, or otherwise) of wheels in truck framing per se or in main framing per se, for example, wheel groups of different diameters, or wheel groups having differing equalizing systems; or to wheel arrangements wherein the grouping arises from the articulation of frames; or to wheel arrangements wherein the grouping comprises driving wheels on the one hand, and non-driving wheels on the other (regardless of framing arrangements); the invention is particularly applicable to and has especial advantages in the distribution of load upon a group of driving wheels in a locomotive main frame and a group of wheels in a truck associated with said frame; and therefore, such application of the invention has been chosen for illustration herein.

Further, although features of the invention may be advantageously applied in association with other types and/or locations of trucks, the invention has a peculiarly advantageous application in connection with locomotive leading trucks, two forms of which are herein illustrated, one involving a single truck axle and the other (which is considered the best embodiment at present known to me) an arrangement with a plurality of axles mounted in a swivelling frame and embodying a rocker-type weight-actuated lateral-motion device.

For a full comprehension of the invention, it is helpful to consider certain problems of the prior art. Take, for example, a locomotive having two or more driving axles journalled in the main frame, with or without a trailing truck, and having a 4-wheel leading truck. The trailing truck (if any) may or may not have an equalizing system coupled up to the equalizing system of the driving wheels. In this typical locomotive, let us assume that all (or a group) of the driving wheels on one side are equalized together; the two axles of the leading truck are equalized together either by their frame or by separate equalizers at the sides thereof; and the front ends of the equalizing systems for the two sides of the driving wheel group are cross-connected by a transverse equalizer, which in turn is coupled by a central equalizing beam to the truck center bearing.

Let us suppose further that in such typical prior locomotive each of the two axles in the leading truck is to carry 37,500 pounds of superstructure load, and each of the driving axles is to carry 50,000 pounds of such load. If the springs over the front driving axle receive half of their superimposed weight from the equalizer means to the rear thereof and half from the transverse equalizer forwardly thereof, then, in the example given, 25,000 pounds must be imposed upon said transverse equalizer by the rear end of the central equalizing beam. The front end of said equalizing beam must impose on the truck the full superstructure load intended for both axles thereof, i. e. a total of 75,000 pounds. To secure that distribution, it is obviously necessary that the said equalizing beam be fulcrumed on the main frame at a point which divides its lever arms in the ratio of 1 to 3; the short lever arm bearing upon the truck, and the long lever arm upon the transverse equalizer in front of the first driving axle.

While such ratio of arms may vary in different designs, it is a fact that the arrangement of short and long lever arms on an equalizer member interconnecting the leading truck and the driver spring rigging is typical of the prior art, and that this leads to serious problems, of which one example should here be given. A vertical displacement at the truck center produces a multiplied movement at the rear end of the interconnecting equalizer just described. In the example given, a vertical motion of 1 inch at the front end of the equalizer is accompanied by an opposite vertical motion of 3 inches at the other end. Under some conditions of track and of locomotive operation, this can cause (or permit, under the effect of certain forces) upward and downward motions of one or more of the driving axles sufficient to lift a driving wheel clear of the rail or to exert a downward impact upon a pedestal binder sufficient to fracture the frame, for instance in the region of the pedestal jaws.

Sometimes these results flow from several additive causes, for example: if the truck is of the weight-centered swing-motion type, and the locomotive is traversing a curve, the truck center bearing will rise to an extent determined by the design of the weight-actuated centering mechanism and the degree of track curvature. To this effect may be added a part of the distorting effect of the super-elevation of the outer rail on the curve, the possible effect of centrifugal force on the locomotive, and the possibility of a track irregularity acting in the additive sense. Obviously, the combined effect may be an exceptional vertical movement of the truck center bearing and thus of the front end of the equalizer, and this motion is multiplied by the opposite (longer) arm of the equalizer sufficient to cause such a change in load on one of the adjacent driving wheels as to permit the latter to move excessively up or down (under the cumulative effect of unbalanced rotating masses, which are always present); under which conditions frame breakage may occur, or a driving wheel may rise off the rail or hammer thereon with consequent damage to track as well.

The seriousness of such results is at once apparent. Even the lesser disadvantages, such as rough riding, excessive vibration and wear, poor tracking action, etc., are bad enough.

It is an object of the present invention to minimize or eliminate the above-described difficulties and disadvantages; and further, to accomplish these results by making it feasible, in a very simple way, to reduce or eliminate the disparity in the length of lever arms of locomotive equalizer mechanism; and, more specifically, to apply this cure to the equalizer bar means interconnecting the driver spring rigging and the truck.

According to the preferred embodiment of the invention, the above and other advantages are accomplished by interconnecting the driver spring rigging and the truck by equalizer bar means coupled to the driver spring rigging at a point rearwardly of the forward end thereof.

In terms of function, the invention contemplates a disposition of the equalizer means interconnecting the truck and the driver spring rigging in such manner that the load applied to the latter rigging, through said equalizer means, more nearly approximates that applied therethrough to the truck, than was heretofore feasible in certain of the well-known arrangements.

More specifically, the invention contemplates a weight-distributing system wherein an equalizer member (or a plurality of them, working in parallel) fulcrumed on the weight-carrying framing, and particularly on the vehicle frame, takes weight therefrom and imposes a portion of it upon the equalizing system or spring rigging of one group of wheels between two axles of said group, and imposes the remaining portion thereof upon an adjacent group of wheels at an intermediate position considered longitudinally of said group. Where the latter group consists only of a single pair of wheels on one axle, the weight would be imposed thereon substantially directly over said axle; where said group consists of a pair of axles, the weight would be imposed at a point intermediate the two axles; and where the said group comprises three or more axles (as for example in a 6-wheel truck) the weight may be imposed at any suitable point between the end axles of the truck.

Still more specifically, the invention contemplates the locating of the interconnecting equalizer means—preferably in the form of a single equalizing bar—intermediate the planes of the wheels at each side; one end of said bar being operatively associated with a cross-equalizer located between two axles of a group, and the other end being operatively associated with a bolster mounted on an adjacent group of wheels; and the invention particularly contemplates the utilization of said bar to interconnect said cross-equalizer in a group of driving wheels and the center bearing of a leading truck wherein there is a weight-actuated centering device between the truck structure and its center bearing.

Still further, the invention contemplates an equalizer member of the type described, configured and disposed to pass upwardly over an axle of at least one of the two groups which it interconnects, and desirably over the near axle of each group; and the invention contemplates a special configuration of the framing associated with one of said axles, to serve not only for fulcruming said member, but also to provide clearance to accommodate the motions of said member. Still more specifically, the invention contemplates the arching of said member upwardly over a driver axle, and the configuration of the locomotive main frame, or engine bed, with an upwardly extending arch or pocket, within which said member works. In this way the strength of the frame is maintained, while at the same time a convenient and sturdy housing and mounting for said member is provided, and the driving wheels can be dropped (during shopping) without removing the equalizer member.

Still further objects and advantages of the invention are involved in the provision of a locomotive bed frame (desirably of the cast type) having a horizontal plate or deck formed with an upwardly extending pocket to house an equalizer, the side walls of which pocket may be of substantial vertical depth and also considerable longitudinal extent, so as to stiffen the bed frame, and to carry pulling, buffing and other loads; the location of said pocket in a central longitudinal vertical plane, spaced apart from the side frame members with their pedestal jaws; the provision of sufficient space between said central structure and the side frame structure to accommodate certain parts of the brake rigging, and other elements; and the utilization of such central pocket structure as a mounting, not only for the equalizer member, but also for other parts, such as brake operating elements.

How the foregoing and other objects and advantages are secured by means of the present invention, will be evident from the following description, taken together with the accompanying drawings which illustrate two general embodiments of the invention and a modification of one of them.

Figure 1 is a fragmentary side elevational view of the bed frame and running gear of a locomotive embodying the locomotive suspension of the present invention;

Figure 2 is a top plan view of the structure of Figure 1, but omitting the showing of the wheels and certain other parts;

Figure 7 is a view similar to Figure 1 but illustrating a modification of the invention;

Figure 8 is a sectional view (showing part of the cylinder saddle in elevation), taken on the line 8—8 of Figure 7; and Figure 9 is a fragmentary plan view of the structure of Figure 7, in the region of the truck center pin.

Figure 3:
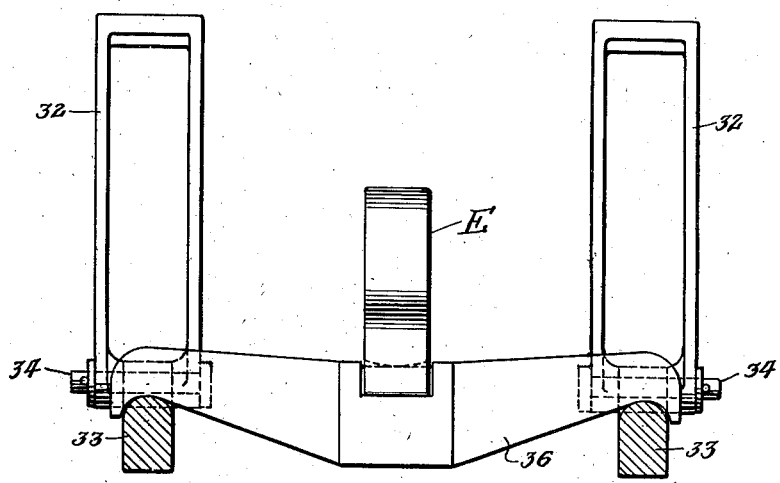
Figure 3 is a sectional view taken on the line 3—3 of Figure 2, but to a larger scale, the cross-equalizer and the end of the central interconnecting equalizer beam being shown in elevation, the bed frame being omitted.

(Unless otherwise limited by the text: the term "wheel group" or "group of wheels" is inclusive of a single pair of wheels on one axle, as well as of two or more pairs of wheels; the term "equalizing member," or equivalent, is inclusive of a flexible member as well as of a rigid bar or the like; the term "weight-transmitting association at a point" or "at a position" is inclusive of transmission of weight through a plurality of physical points, with a resultant imposition of load at a certain virtual point or position; and the term "intermediate position" (considered longitudinally with relation to a group of wheels) is inclusive of a position directly over a single axle where the group of wheels comprises only a single pair, as well as any position intermediate the two end axles of a group of two or more pairs of wheels.)

Referring first to the embodiment illustrated in Figures 1 to 5 inclusive, it will be observed that the front end of a locomotive bed frame B is shown, the same carrying cylinders and chests C, and being supported by two groups of wheels, i. e. a group of driving wheels D and a group of truck wheels T.

The truck is of a well-known 4-wheel type, having a weight-centered lateral-motion assembly generally indicated at 11, the bolster 12 of which has a recessed center plate or seat, which cooperates with the center pin 13 of the center bearing assembly. This group of parts has relative vertical motion with respect to the bed frame B, by virtue of the telescopic mounting of pin 13 within the sleeve 14 secured in the bed frame. The group of truck wheels may be considered as equalized together by the frame of the truck structure, or spring means and/or equalizer means incorporated in the truck. The latter details are not shown, as they are well known in the art.

In general, the bed frame comprises top and bottom walls or plates 15 and 16, which are interconnected by upstanding outside longitudinal side walls 17, inside longitudinal side walls 18, and transverse webs 20 to 25, etc. The double wall effect formed at the sides by the longitudinal vertical members 17 and 18 provides hollow side frame structures, which are formed with pedestal jaws 26, 27, etc., wherein the boxes which journal the driving axles A have vertical sliding movement—the bottoms of the pedestal jaws being closed by the pedestal binders 28.

Seated on each axle box is a saddle 29 having a superimposed spring 31. Links or hangers 32 connect the ends of adjacent springs, through the intermediation of an equalizer 33, pivotally coupled to the lower ends of said links, at 34, 34. There may be additional pairs of drivers behind the two which are illustrated, and in that case the corresponding equalizers 33, between the second and third drivers, and between the third and fourth drivers, etc., would normally each be fulcrumed upon the side frame structure. At the rear of the driving wheel group there may be a trailer truck (not shown), to which the driver spring rigging, just described, is often directly connected.

Thus, all the driving wheels at one side of the frame may be equalized together (and with the trailer truck, if desired); and the same arrangement may be used at the opposite side.

In ordinary construction, the equalizer 33 between the first and second drivers would be fulcrumed in the side frame (just as in the case of that between the second and third drivers, and others to the rear thereof); and if the driver spring rigging was to be equalized with the leading truck the forwardmost driver spring hanger 32a would be connected by a transverse equalizer to the corresponding hanger on the opposite side; and from this transverse equalizer one or more equalizing bars would extend forwardly to the truck.

Figure 4:
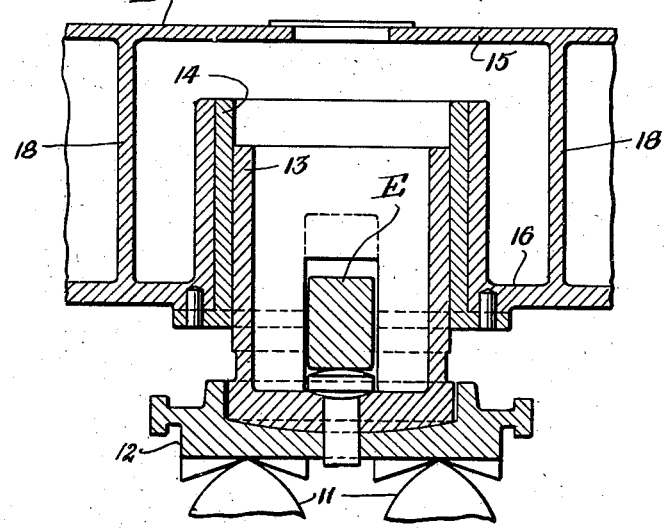
Figure 4 is a detail section at the truck center bearing, showing the association therewith of the front end of the main equalizer beam, this view being taken about on the line 4—4 of Figure 2, but to a larger scale.

According to the present invention, however, the forwardmost driver spring hangers 32a are individually coupled to their respective side frame members, by a pivot 35 and a cushion device comprising a spring 30 and upper and lower spring seats 30U and 30L, the upper spring seat being integral with the frame, and the lower being carried on the pivot 35. The equalizers 33 between the first and second drivers are interconnected by a transverse equalizer 36 (see Fig. 3), which in turn receives weight from the rear end of the main central equalizer E. The forward end of this equalizer E transmits weight to the truck center bearing, as seen in Figures 1 and 4.

Figure 5:
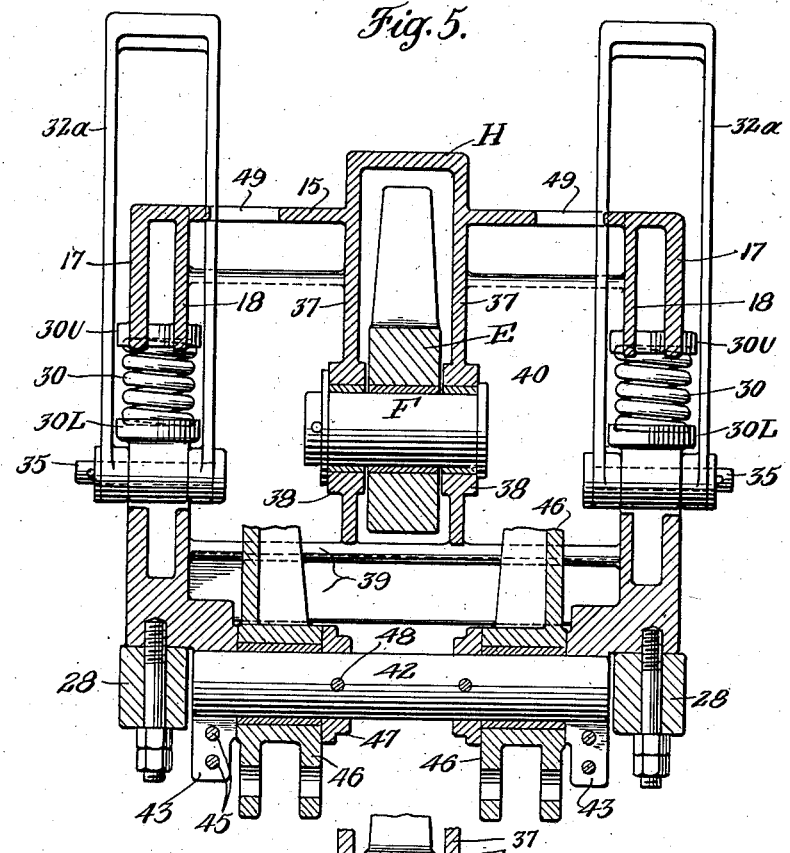
Figure 5 is a section taken at the equalizer fulcrum, approximately on the line 5—5 of Figure 1, but to a larger scale.

This main equalizer beam E, as shown in Figures 1 and 5, is fulcrumed upon and receives weight through the fulcrum pin F which forms a pivot for said beam or lever approximately midway of its ends.

It will be observed that the lever E overlies not only the rear axle of the truck wheels T but is also arched upwardly to overlie the first driver axle A, so as to extend to the rear thereof, for cooperation with the equalizing portion of the spring rigging between the first and second driver axles.

An elongated inverted pocket or housing H is formed in the upper wall of the engine bed, to accommodate and house the equalizer E. The side walls of said housing, shown at 37, extend longitudinally beyond the housing proper, to form a central box-like strengthening beam within the bed casting, as seen in Figures 2 and 5; and these vertical walls 37 extend downwardly to a considerable depth (of variable contour as seen in Fig. 1) so as to add to the vertical stiffness of the bed, and also to form a fulcrum support for the equalizer fulcrum F, at the location of which these walls are thickened or provided with bosses 38.

In general, the bottom edges of the side walls of the equalizer pocket, in the region just over the rear truck wheels (as seen in Fig. 1) are at the level of the base plate 16 of the bed casting. In the vicinity of the aperture 10 through the side frame, the bottom edges of said walls drop down to the level of the top of the transverse angle structure 39. These walls then follow the contour of the transverse wall 40 which arches upwardly over the first driving axle location; and from thence rearwardly the bottom edges of said side walls of the pocket follow approximately along the line 41 (seen in Fig. 1); and from the vicinity of the second driving axle back, the structure ceases to be a pocket for the equalizer but continues as a central strengthening structure, the depth of which is shown at 41a.

Referring again to Figure 5, it will be observed that a transverse brake lever shaft 42 is secured in brackets 43 formed at the base of the side structure of the frame, suitable securing blocks 44 and bolts 45 being provided. The pedestaal binders 28 may be so located as to prevent endwise displacement of the brake shaft 42 (as shown). On the shaft 42 are pivoted two brake levers 46, which at their outer faces are positioned by the structure 43, and at their inner faces by the collars 47 secured by suitable pins 48.

Between the side wall structure of the frame and the central pocket structure for the equalizer, space is provided for the upwardly extending brake levers 46, which may pass up through the apertures 49 in the deck of the bed frame, for attachment to the piston rods protruding from the brake cylinders 50 which are mounted on pads 51 formed on the top of the bed frame. Not only do these parts interfit nicely with the equalizer pocket structure, but the latter also provides stiffening for the frame in the region where the apertures 49 must be provided for the brake rigging.

Figure 6:
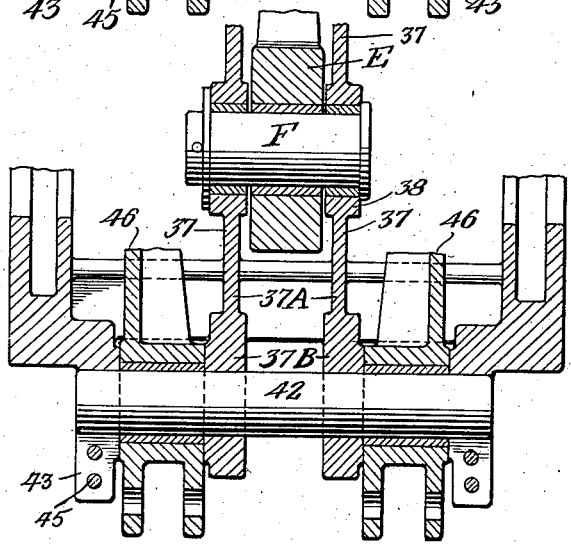
Figure 6 is a fragmentary view similar to Figure 5, illustrating a modified construction, wherein the equalizer pocket is extended downwardly to form a support for part of the brake rigging.

In the modification of Figure 6, the structure is the same as in Figure 5, except that the side walls 37 of the equalizer pocket extend downwardly at 37A, and are provided with bosses or thickened portions 37B, forming supports for the brake lever shaft 42 and at the same time serving to position the brake levers 46 at their inner faces, thereby eliminating the collars 47 and their retaining pins.

Figures 7 to 9 illustrate the second general embodiment of the invention. In this arrangement, I have shown a bar-type main frame, comprising side structures B1, B2, which are joined by the saddle casting S, bolted thereto (as shown in Fig. 8) and carrying a cylinder-and-chest unit C' at each side. The side frames are also joined by the bumper casting 52 which centrally carries a center pin guide 14' for the center pin 13'. Other transverse structures may be provided between the side frame members, in the region of the driving wheels, in accordance with known practice.

The truck in this form comprises a single pair of truck wheels T', a lateral motion bolster 12', and a radius bar 53 pivoted at 54 to a transverse structure of the main frame.

Driving spring saddles 29', springs 31', hangers 32', and equalizers 33' are provided, as in the first embodiment. The forwardmost spring hanger 32a' is pivoted directly to a lug on the frame, at 35'.

The equalizer member E' has its forward end associated with the truck center pin (as before), the front frame casting 52 being centrally slotted at H' to receive the equalizer. At its rear end the equalizer E' bears upon the transverse equalizer 36', as in the first embodiment. Substantially midway of its ends, it is fulcrumed at F' in the side walls 37' of a bracket 55, bolted to the bottom of the cylinder saddle, as shown in Figure 8.

From the foregoing description of two embodiments of the invention, as well as the modification shown in Figure 6, it will now be evident how I apply the principles set forth at the beginning of this specification, and how the various objects and advantages there mentioned are secured.

Although I do not intend a quantitative limitation to be placed upon the invention, it would here be useful for purposes of illustration to draw numerical comparisons between the arrangements of the present invention and the prior art example given in the first part of the specification, wherein a 4-wheel leading truck was to carry a total of 75,000 pounds of the superstructure load, and 50,000 pounds was to be imposed on each driving axle.

In the example of the prior art, the equalizer between the truck and the front end of the driver spring rigging had to have short and long lever arms, in the ratio of 1 to 3, since the rear arm of the lever was only used to transmit 25,000 pounds, i. e. half of the load on the first driver axle.

By my arrangement, the rear arm of said equalizer (being connected to the driver spring rigging between the first and second driver axles) would be utilized to transmit half of the load imposed on the first driver axle plus half of the load imposed on the second, i. e. a total of 50,000 pounds. If the load to be imposed on the truck is 75,000 pounds (as in the prior art example) the lever arm ratio with my arrangement would be 1 to 1½—a very great improvement over the 1 to 3 ratio in the prior art example.

The actual arrangement shown in Figures 1 to 5 (wherein the lever arms of the equalizer E are approximately equal) would be used where the load to be carried on the front truck approximately equals the load to be imposed on one driving axle. The common prior art arrangement (for this weight distribution) would require a lever arm ratio of 1 to 2.

The embodiment of Figures 7 to 9 (wherein the lever arms are also approximately equal) would be used in cases where it is desired to impose a heavier axle load on the truck axle than on each of the driver axles.

To those skilled in the art, all of the foregoing will be quite clear and various other advantages will also be apparent; and it will further be evident that the principles of the invention can be applied in a variety of structural forms.

I claim:

1. Locomotive suspension comprising, in combination, a locomotive frame configured to journal at least two driving axles and to receive beneath the frame a truck adjacent an end driving axle, and having means intermediate the planes of the wheels at the two sides configured to accommodate an equalizer member lying in a plane which extends across adjacent truck and driving axles, and an equalizer member in the location so provided, fulcrumed intermediate its ends in said frame at a point between the truck and the adjacent driving axle, and having one arm extended at least to the region of the truck axle next to the driving wheels, for transmitting weight to the truck, and another arm extended to a point substantially intermediate the first and second driver axle locations, for transmitting weight in common to the first and second driver axles, whereby for the desired distribution of weight between the truck and driving axles the fulcrum of the equalizer member is located closer to the center of said member than would otherwise be feasible, and an excessive disproportion of the arms of said member is thus avoided.

2. In a locomotive having adjacent groups of wheels, at least one group of which comprises at least two axles, a load distributing system comprising equalizing mechanism common to said two axles, a frame, and, mounted on said frame, an equalizing member fulcrumed at an intermediate point to provide two lever arms, one of which adjacent its free end has a weight-transmitting association with said mechanism at a point between said two axles of said one group of wheels and the other of which adjacent its free end has a weight-transmitting association with the other group of wheels, at an intermediate position considered longitudinally of the latter group.

3. In a locomotive having adjacent groups of wheels, at least one group of which comprises at least two axles, a load distributing system comprising spring rigging common to said two axles, and a double-armed intermediately-fulcrumed equalizer member which adjacent one arm end has a weight-transmitting association with said spring rigging at a point between said two axles of said one group of wheels and adjacent its opposite arm end has a weight-transmitting association with wheels of the other group, at an intermediate position considered longitudinally of the latter group.

4. A construction according to claim 3, wherein said equalizer member is positioned to extend over adjacent axles of the two groups of wheels.

5. A construction according to claim 3, wherein the first mentioned group of wheels comprises driving wheels of relatively large diameter and the second mentioned group of wheels comprises truck wheels of relatively small diameter, and the equalizer extends over a truck axle.

6. A construction according to claim 3, wherein the second mentioned group of wheels comprises a truck structure with a plurality of pairs of truck wheels which are equalized together by the truck structure, and the said equalizer member bears upon said truck structure intermediate the ends thereof.

7. A construction according to claim 3, wherein the second mentioned group of wheels comprises a truck structure with a center bearing and a plurality of pairs of truck wheels which are equalized together by the truck structure, and the said equalizer member transmits weight to the truck structure at the center bearing.

8. A construction according to claim 3, wherein the first mentioned group of wheels comprises driving axles and the second mentioned group of wheels is in a truck, and a transverse equalizer interconnects the spring rigging at the two sides of the locomotive between the first and second driving axles, said equalizer member bearing at one end upon the truck structure and at the other end upon said transverse equalizer.

9. A construction according to claim 3, wherein the second-mentioned group of wheels comprises truck wheels and wherein there is an element having a weight-centered mounting with respect to said wheels, said equalizer extending over truck and driving axles to bear upon said element and upon said spring rigging.

10. A construction according to claim 3, wherein the first mentioned group of wheels comprises driving axles and the second mentioned group of wheels is in a truck, and a transverse equalizer interconnects the spring rigging at the two sides of the locomotive between the first and second driving axles, said equalizer member bearing at one end upon the truck structure and at the other end upon said transverse equalizer, said equalizer member being arched upwardly across the first driving axle.

11. A construction according to claim 3, wherein the first mentioned group of wheels comprises driving axles and the second mentioned group of wheels is in a truck, and a transverse equalizer interconnects the spring rigging at the two sides of the locomotive between the first and second driving axles, said equalizer member lying substantially in the plane of symmetry of the locomotive and bearing at one end upon the truck structure and at the other end upon said transverse equalizer.

12. A construction according to claim 3, wherein the first mentioned group of wheels comprises driving axles and the second mentioned group of wheels is in a truck, and a transverse equalizer interconnects the spring rigging at the two sides of the locomotive between the first and second driving axles, said equalizer member lying substantially in the plane of symmetry of the locomotive and bearing at one end upon the truck structure between two truck axles and at the other end upon said transverse equalizer.

13. A locomotive bed frame casting comprising longitudinally-extending substantially horizontal decking, vertically-positioned side frame members constructed to accommodate driving wheel axle journals, a pair of vertically-positioned longitudinally-extending intermediate members of considerable vertical depth, the latter members being spaced from the side frame members but joined thereto over a substantial extent longitudinally by means of said decking, said intermediate longitudinal members being located and configured to receive between them an equalizer and apertured to provide a fixed axis for fulcruming such equalizer, and said intermediate longitudinal members being further extended beyond the location of such equalizer and thus serving to stiffen the bed casting and to assist in taking pulling, buffing and other loads.

ALBERT J. TOWNSEND.